US009607171B2

(12) United States Patent
Dhoolia et al.

(10) Patent No.: US 9,607,171 B2
(45) Date of Patent: Mar. 28, 2017

(54) PREVENTING SHARING OF SENSITIVE INFORMATION THROUGH CODE REPOSITORIES

(71) Applicant: International Business Machines Corporation, Armonk, NY (US)

(72) Inventors: Pankaj Dhoolia, Bangalore (IN); Senthil Kumar Kumarasamy Mani, Bangalore (IN); Rohan Raju Padhye, Bangalore (IN); Vibha Singhal Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 14/537,026

(22) Filed: Nov. 10, 2014

(65) Prior Publication Data

US 2016/0132694 A1 May 12, 2016

(51) Int. Cl.
*G06F 21/62* (2013.01)
*G06F 21/60* (2013.01)

(52) U.S. Cl.
CPC ........ *G06F 21/6245* (2013.01); *G06F 21/602* (2013.01); *G06F 21/6254* (2013.01)

(58) Field of Classification Search
CPC . G06F 21/6245; G06F 21/6254; G06F 21/602
See application file for complete search history.

(56) References Cited

U.S. PATENT DOCUMENTS

| 7,954,043 | B2 * | 5/2011 | Bera | G06F 17/30008 707/781 |
| 8,458,487 | B1 * | 6/2013 | Palgon | G06F 21/00 380/277 |
| 8,612,753 | B2 | 12/2013 | Rasheed et al. | |
| 2004/0064733 | A1 * | 4/2004 | Gong | G06Q 10/107 726/27 |
| 2012/0131075 | A1 | 5/2012 | Mawdsley et al. | |
| 2013/0152047 | A1 * | 6/2013 | Moorthi | G06F 11/368 717/124 |
| 2014/0201541 | A1 | 7/2014 | Paul et al. | |

OTHER PUBLICATIONS

Kevin Coogan, Dec. 8, 2008, "Backward Static Program Slicing", University of Arizona, pp. 1-16 http://math.arizona.edu/~glickenstein/math443f08/coogan.pdf.*
Google Java Book API, https://developers.good.com/api-client-library/java/apis/books/v1, accessed Oct. 21, 2014, pp. 1.

* cited by examiner

*Primary Examiner* — Robert Leung
*Assistant Examiner* — Thomas Ho
(74) *Attorney, Agent, or Firm* — Ryan, Mason & Lewis, LLP

(57) ABSTRACT

Methods, systems, and computer program products for preventing sharing of sensitive information through code repositories are provided herein. A method includes detecting one or more items of sensitive information in a check-in associated with a given user in a shared version management system; automatically refactoring the one or more items of sensitive information in the check-in by externalizing the one or more items of sensitive information as an encrypted file; and upon acceptance by the user of one or more changes to the check-in, automatically (i) decrypting the encrypted file using one or more code repository credentials associated with the given user, and (ii) incorporating the one or more items of sensitive information into the check-in.

15 Claims, 6 Drawing Sheets

```
1   from coinbase import CoinbaseAccount
2
3
4   def without_auth():
5       return CoinbaseAccount ()
6
7
8   def with_key():
9       return CoinbaseAccount (api_key=api_key)
10
11
12  def without_oauth():
13      # Don't actually set up oauth2 credentials, because this will fail if
14      # we're testing under python3. Some day when we have an oauth2 client
15      # that supports python™3, we can change this.
16      a = CoinbaseAccount()
17      a.authenticated = True
18      a.auth_params = {}
19      return a
20
21
22  api_key = ( ' f64223978e5d99d07cded069db2189a '
23            ' 38c17142fee35625f6ab3635585f61ab ')
```

FIG. 2

```
1   from coinbase import CoinbaseAccount
2
3   def without_auth() :
4       return CoinbaseAccount ()
5
6   def with_key() :
7       return CoinbaseAccount (api_key=api_key)
8
9   def without_oauth() :
10      # Don't actually set up oauth2 credentials, because this will fail if
11      # we're testing under python™3. Some day when we have an oauth2 client
12      # that supports python™3, we can change this.
13      a = CoinbaseAccount()
14      a.authenticated = True
15      a.auth_params = {}
16      return a
17
18  config = ConfigParser.RawConfigParser()
19  config.read('LeakyKeysFile.properties')
20  api_key = config.get('api_key','api_key')
```

302 — Refactored file

304

| api_key=5e3af23cee509ddb9b4d446aefb9c50530d80bac | LeakyKeyFile.properties: server copy |

306

| api_key=API_KEY | LeakyKeyFile.properties: client copy |

FIG. 3

```
1   from coinbase import CoinbaseAccount
2
3
4   def without_auth():
5       return CoinbaseAccount()
6
7
8   def with_key():
9       return CoinbaseAccount(api_key=api_key)
10
11
12  def with_oauth():
13      # Don't actually set up oauth2 credentials, because this will fail if
14      # we're testing under python3. Some day when we have an oauth2 client
15      # that supports python™3, we can change this.
16      a = CoinbaseAccount()
17      a.authenticated = True
18      a.auth_params = {}
19      return a
20
21  config = ConfigParser.RawConfigParser()
22  config.read('LeakyKeysFile.properties')
23  api_key = config.get('api_key','api_key')
``` api_key=5e3af23cee509db9b4d446aefb9c50530d80bac   LeakyKeyFile.properties: client copy api_key=5e3af23cee509db9b4d446aefb9c50530d80bac   LeakyKeyFile.properties: server copy Refactored file — 302

PREVENTING SHARING OF SENSITIVE INFORMATION THROUGH CODE REPOSITORIES

FIELD OF THE INVENTION

Embodiments of the invention generally relate to information technology, and, more particularly, to information protection techniques.

BACKGROUND

Increasingly, reusable functionality is being provided by companies as application programming interfaces (APIs) that can be invoked by multiple applications. Most APIs impose some form of access control, such as requiring an account name and/or password to connect, registering for and/or using a developer (or access) key to connect, etc. As such, developers using an API need to include such credentials in the developed code, and share the code over a source code management system. However, potentially many individuals have access to the code management system, and, therefore, unauthorized individuals may obtain access to the access key and/or other credentials.

Existing access control approaches, however, manual exercises that are labor-intensive. Accordingly, a need exists for techniques for automatically preserving privacy of security information such as API keys and user credentials.

SUMMARY

In one aspect of the present invention, techniques for preventing sharing of sensitive information through code repositories are provided. An exemplary computer-implemented method can include steps of detecting one or more items of sensitive information in a check-in associated with a given user in a shared version management system; automatically refactoring the one or more items of sensitive information in the check-in by externalizing the one or more items of sensitive information as an encrypted file; and upon acceptance by the user of one or more changes to the check-in, automatically (i) decrypting the encrypted file using one or more code repository credentials associated with the given user, and (ii) incorporating the one or more items of sensitive information into the check-in.

In another aspect of the invention, an exemplary computer-implemented method can include steps of detecting one or more items of sensitive information in a check-in associated with a given user in a shared version management system; automatically refactoring the one or more items of sensitive information in the check-in by externalizing the one or more items of sensitive information as an anonymized file; and upon acceptance by the user of one or more changes to the check-in, automatically replacing the anonymized file in the check-in with a stored instance of the one or more items of sensitive information.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 a diagram illustrating an example embodiment of the invention;

FIG. 3 is a diagram illustrating an anonymization solution in connection with the example embodiment of the invention depicted in FIG. 2;

FIG. 4 is a diagram illustrating an encryption solution in connection with the example embodiment of the invention depicted in FIG. 2;

DETAILED DESCRIPTION

Figure 1:
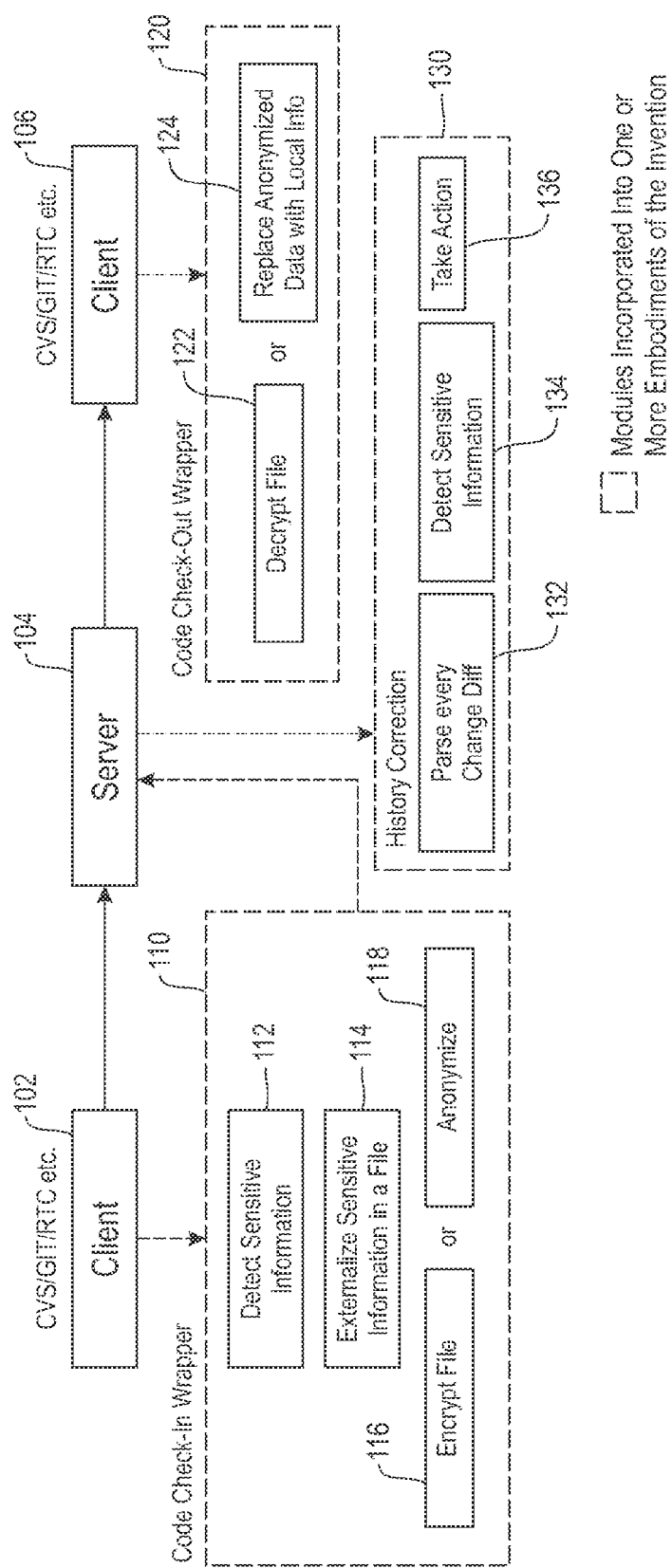
FIG. 1 is a diagram illustrating system architecture, according to an example embodiment of the invention.

As described herein, an aspect of the present invention includes preventing sharing of sensitive information through code repositories. At least one embodiment of the invention includes automatically re-factoring code to preserve the privacy of sensitive and/or security-related information such as API keys and/or user credentials within the code to prevent un-authorized access of the sensitive and/or security-related information.

As further detailed herein, at least one embodiment of the invention includes implementing a version management wrapper that automatically senses project settings of a developer and automatically refactors given user credentials by externalizing sensitive information (present in the given user credentials) in the form of an encrypted file and/or by anonymizing the sensitive information. As used herein, a version management wrapper refers to a software module that can be plugged into the software of an existing version management system and is invoked anytime a commit (that is, a collection of changes enacted on files stored in the version management system) is delivered into the system. Such a wrapper can be implemented, for example, on the server-side or the client-side. Further, in the anonymization process, at least one embodiment of the invention includes replacing identified sensitive information (such as API keys, client identifiers (IDs), client secrets, etc.), with a standard text string. This ensures that the code complies after anonymization, though the developer will not be able to access the sensitive information without replacing the standard string with the correct key.

Embodiments of the invention such as detailed above can additionally include, upon detecting authorized developer access of the sensitive information (such as API keys), decrypting the sensitive information if such information has been encrypted. Alternatively, such an embodiment of the invention can also include, upon detecting authorized developer access of the sensitive information, replacing an anonymized file with the sensitive information with a local copy of the information if such information was anonymized.

Accordingly, given an example incorporating API keys, one or more embodiments of the invention can include the following actions. Initially, an attempt by a developer to check-in is detected and/or observed by a version management wrapper. As used herein, a check-in refers to an instance wherein a developer has made modifications to certain files that have been shared through the version management system and is delivering his or her local changes to these files back to the version management system. Each check-in contains a collection of changes enacted on one or more files that were stored in the version management system. Subsequently, the version management wrapper responds by analyzing the check-in attempt and revealing a key leak. As used herein, a key leak refers to an instance wherein a user has shared his or her (private) credential information to access a particular API verbatim in code. Other users could not use the same credential information to access the API from the existing code nor use the credential information to access the API from outside of the code. A key leak is conceptually similar to a person posting (perhaps accidentally) his or her credit card ID and verification code publically wherein multiple people might have access to such information.

In response to the key leak, the version management wrapper proposes auto-correct options, and determines if the options are applicable. Depending on the project settings, once a leak is detected by the version management system, the system can choose to carry out one of the following actions: (i) highlight the leaks to the developer, who can then anonymize and/or remove the information and attempt to check-in again; (ii) automatically replace the sensitive information with standard strings (that is, anonymization), and display the modifications made to the developer for acceptance or rejection; or (iii) if the project option was to allow sharing of sensitive information, albeit in encrypted format, encrypt the key leaks identified in the check-in, display a report to developer, and commit the check-in. If the system is applying the fix, then the system can refactor the code to move values of all sensitive keys to a separate properties file that is loaded in the code. This ensures that there is a single file that needs to be modified whenever any edits to key values are to be done.

If one or more of the options (as detailed above) are applicable, then the developer check-in attempt is permitted to succeed. If the options are not applicable, then the developer check-in attempt is rejected with an appropriate message. If the developer does not perform a modification and/or accept the modifications carried out by system, then the check-in is not allowed. The project administrator, however, can make an explicit rule indicating that the system allow sensitive information to be shared, and only in such a case can the developer override the error and still check-in code.

At least one embodiment of the invention additionally includes implementing a server-side history correction for key leaks in connection with a user that is already checked-in. The server-side history correction includes analyzing a repository, rectifying the detected and/or observed leaks, and modifying a relevant history (hashes for change-sets, etc.). By way of example, there may already be existing code-bases wherein key leaks might have occurred. In order to remove the leaks from such code, at least one embodiment of the invention includes implementing a software module on one or more version management system servers that can detect such key leaks from existing code shared in these systems and appropriately anonymize or encrypt the key leaks. Also, for each code-base shared, there is a history of modifications performed on the files, which can be saved, for example, in the version management system as text diffs. The server-side correction module detects such key leaks not only from the latest version of the file, but also from the modification history, and appropriately replaces the key leaks in the differences that are logged. Additionally, the server-side correction includes notifying the user (who is already checked-in) of the key leaks to facilitate and/or suggest the undertaking of one or more appropriate actions (for example, regenerating the leaked keys).

A version management wrapper, such as detailed herein in connection with one or more embodiments of the invention, encompasses various capabilities. For example, the version management wrapper analyzes check-ins (also referred to herein as commit statements; that is, statements rendering a set of tentative changes permanent) to identify API-key usage. Additionally, the version management wrapper issues a preventive warning pertaining to API-key leaks to corresponding users, and informs the users that the changes they had delivered in the past have key leaks that the system is auto-fixing. Further, the version management wrapper automatically refactors the identified API-key usage to externalize, document, and/or ignore the actual keys properties. Also, as noted above, the version management wrapper rectifies version management history, change-sets, and repositories to eradicate API-key revealing check-ins. Depending on how the version management system preserves and/or logs the changes between one file version to another, the rectification module implementation can differ. If the version management system saves the differences directly as text, then the differences text is analyzed to identify the key leak and appropriately anonymize or encrypt such leaks. If the version management system stores each file revision, then each revision is analyzed.

FIG. 1 is a diagram illustrating system architecture, according to an embodiment of the invention. By way of illustration, FIG. 1 depicts a first client 102, a server 104, a second client 106, a code check-in wrapper 110, a code check-out wrapper 120 and a history correction component 130. In accordance with one or more embodiments of the invention, client 102 and client 106 represent two distinct clients. In the example embodiment depicted in FIG. 1, client 102 has made modifications to code that contains a key leak, and checks that into the version management system. Client 106 pulls this change from version management system. For client 102, code check-in wrapper 110 detects that a key leak is occurring and takes action of anonymization, refactoring and/or encryption. For client 106, in the case of encryption, code check-out wrapper 120 detects and decrypts the sensitive information. If refactoring had been carried out to a separate properties file, then the wrapper 120 would auto-replace the pulled copy with the developer's local copy and highlight if any additional properties were added so that the developer can provide an appropriate value for such properties. Further, in at least one embodiment of the invention, code check-in wrappers and code check-out wrappers can be implemented on the client-side and/or on the server-side of any version management system. A history correction module (such as depicted as component 130 in FIG. 1) is implemented on the server-side.

As also noted in FIG. 1, client 102 can include a concurrent versions system (CVS), Git, rational team concert (RTC), etc. As noted above and further illustrated in FIG. 1, code check-in wrapper 110 includes a sensitive information detection component 112, a sensitive information externalization component 114, an encryption component 116 and an anonymization component 118. Also, code check-out wrapper 120 includes a decryption component 122 and an anonymized data replacement component 124.

Accordingly, in connection with the example embodiment of the invention illustrated in FIG. 1, when a user or developer commits, component 112 of code check-in wrapper 110 automatically detects sensitive information by identifying the particular API in use, and utilizes backward code slicing to identify where credential information is being used. As used in the previous sentence (and additionally herein), "sensitive information" and "credential information" are being used synonymously. As further described below, identifying the particular API in use is carried out using a pattern library.

Given an API, from its documentation, all methods that take in some sensitive information can be identified. Given a new code file, all invocations to such API methods can then be identified. Subsequently, referring back to the example embodiment depicted in FIG. 1, a change diff parsing module 132 of the history correction component 130 can perform a backward parse on the code (that is, a backward code slicing) to identify how the arguments that take "credential information" passed to this method or function are constructed (via assistance, for example, from sensitive information detection component 134 of the history correction component 130). At some place in the code of this argument, a static string value can exist, and this static string value is highlighted as a leaky key and appropriate action taken can be taken thereon by action component 136 of the history correction component 130.

Further, as noted above, component 114 externalizes the identified credential information in a text file. In at least one embodiment of the invention, this externalization can include modifying selected code appropriately to invoke the text file. Additionally, as depicted in FIG. 1, and depending on given project settings, code check-in wrapper 110 can either encrypt the externalized text file or anonymize the externalize text file. If anonymized, the related user settings can be saved in a local file that is not committed (for example, added to files to be ignored). By way of illustration, when a project administrator creates a project on a version management system, the system will provide the administrator an option to set the properties for how to handle leaky keys (anonymization, encryption, etc.). The administrator can also determine the level of enforcement; that is, whether leaky keys have to be actioned upon mandatorily or whether the developer can override the enforcement. In the case of an encryption option, the administrator is also able to specify the encryption password.

When a user or developer accepts incoming changes, code check-out wrapper 120 automatically detects if an anonymized or encrypted file exists in the incoming changes. At any point in time, the client has a particular version of the code-base that (s)he had checked-out and/or pulled from the version management system. The incoming changes contain the additional modifications (for example, check-ins) on the version management server that a developer's local copy does not have.

If an anonymized file exists in the incoming changes, component 124 of code check-out wrapper 120 replaces the anonymized file with a local copy of the file. The code-base will not be able to run without the correct key values. Hence, the overall system needs to provide a way for the developer to specify his or her API keys without those changes being overwritten with every commit In an anonymization scenario, each developer supplies his or her own key values.

Once the developer provides the key values, such values are saved in a local filesystem on the developer's workstation. Anytime an incoming change on the leaky key properties file is detected, the checkout wrapper takes the server copy and adds any new properties defined in the server copy into the developer's local copy, and prompts the developer to supply those values. All earlier values of the properties are retained from the developer's local copy. This ensures that though the server copy contained anonymized data, the developer can still use his or her keys to run the code without needing to modify the file with every checkout. For an encryption scenario, when an incoming change contains modifications to the leaky key properties file, the check-out wrapper 120 auto-decrypts the file (via component 122) after acceptance from the server. The system already has access to the encryption/decryption password(s) because the developer is logged-in as an authenticated user for the project.

If additional properties are added via a local copy, the user or developer can be prompted to provide the relevant values. If an encrypted file exists in the incoming changes, component 122 decrypts the file using the user's code repository credentials. Accordingly, in one or more embodiments of the invention, only users or developers who belong to the given project will be able to decrypt the file.

As noted above, identifying the particular API in use can be carried out using a pattern library. As such, a pattern library can include data patterns and/or API invocation patterns that help detect that a key or user credentials are being used. An example of a data pattern can include a 64 character string (non-dictionary), while an example of an API pattern can include programming language aspects such as module discovery, function call build, etc. Additionally, in at least one embodiment of the invention, patterns can be extracted from API/usage documentation and/or can be manually generated. At least one embodiment of the invention can include creating a dictionary of such patterns and creating a repository wherein different users can share the patterns that they have identified. Also, at least one embodiment of the invention can include using text analysis techniques to parse API documentation and identify all methods that take in arguments with noted words such as "key," "client," "password," etc.

Consider, for example, an embodiment of the invention in connection with a code management systems. Such an embodiment includes identifying sensitive information given API invocation calls. By way of example, from the Google® Java Book API, note that argument 1 to BooksRequestInitializer is the API key. The sensitive information detector (such as component 112 in FIG. 1) will find all calls to BooksRequestInitializer and infer a location from where the value of the first parameter is derived. In this example case, the value is derived from "key," and as such, the value of the key needs to be privacy preserved. As used herein, privacy preserved refers to a scenario wherein the value of a key is leaky and, hence, the key is to be anonymized or encrypted. The key values are only obfuscated when in the server. On client systems, the developers need these keys to be able to execute code. Accordingly, the example embodiment of the invention includes ensuring that at the time of checkout, the anonymized and/or encrypted data are handled in such a way that the user need not manually manage the keys. Additionally, the developer-specific values for sensitive keys are not overwritten at every check-in and check-out.

FIG. 2 is a diagram illustrating an example embodiment of the invention. By way of illustration, FIG. 2 depicts a file 202, which includes a key leak 204 in the code. FIG. 3 is a diagram illustrating an anonymization solution in connection with the example embodiment of the invention depicted in FIG. 2. By way of illustration, FIG. 3 depicts the refactored file 302 (that is, a refactored version of file 202 in FIG. 2), a leaky key file 304, and an anonymized version 306 of leaky key file 304. FIG. 4 is a diagram illustrating an encryption solution in connection with the example embodiment of the invention depicted in FIG. 2. By way of illustration, FIG. 4 depicts the refactored file 302 (that is, the refactored version of file 202 in FIG. 2), the leaky key file 304, and an encrypted version 406 of the leaky key file 304.

Figure 5:
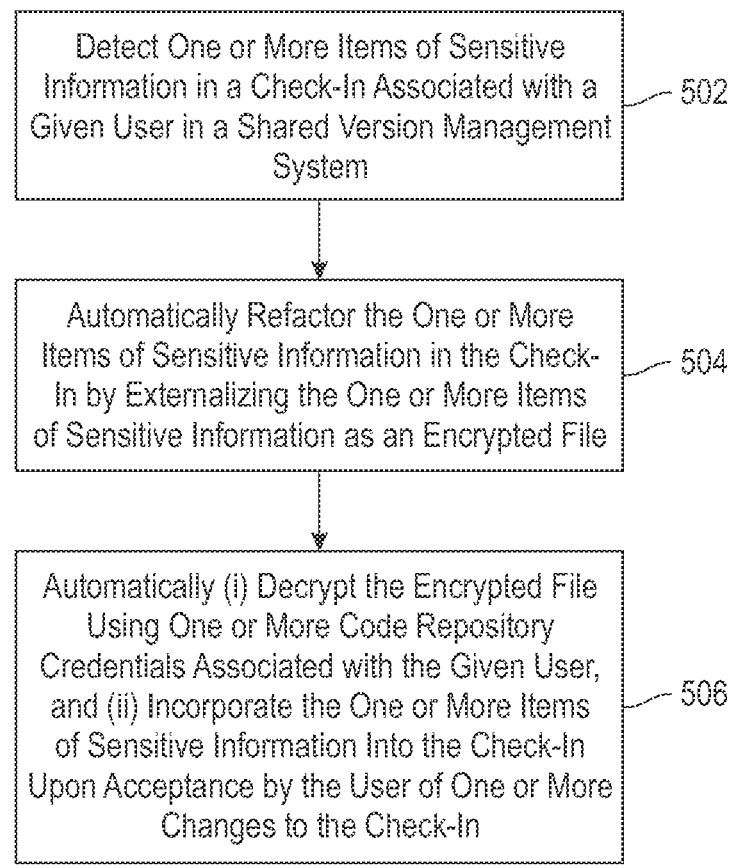
FIG. 5 is a flow diagram illustrating techniques according to an embodiment of the invention.

FIG. 5 is a flow diagram illustrating techniques according to an embodiment of the present invention. Step 502 includes detecting one or more items of sensitive information in a check-in associated with a given user in a shared version management system. Detecting can include performing code analysis to identify application programming interface key usage. Additionally, performing code analysis can include using a pattern library to identify application programming interface key usage and/or performing backward code slicing to identify application programming interface key usage. Also, as detailed herein, the one or more items of sensitive information can include user credentials.

Step 504 includes automatically refactoring the one or more items of sensitive information in the check-in by externalizing the one or more items of sensitive information as an encrypted file. The encrypted file can include an encrypted text file. Step 506 includes automatically (i) decrypting the encrypted file using one or more code repository credentials associated with the given user, and (ii) incorporating the (exposed) one or more items of sensitive information into the check-in upon acceptance by the user of one or more changes to the check-in.

The techniques depicted in FIG. 5 can also include automatically determining one or more project settings associated with the user, as well as generating a preventive warning based on the one or more items of sensitive information detected in the check-in.

Further, similar to the techniques depicted in FIG. 5, at least one embodiment of the invention can include detecting one or more items of sensitive information in a check-in associated with a given user; automatically refactoring the one or more items of sensitive information in the check-in by externalizing the one or more items of sensitive information as an anonymized file; and upon acceptance by the user of one or more changes to the check-in, automatically replacing the anonymized file in the check-in with a stored instance of the one or more items of sensitive information.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 6:
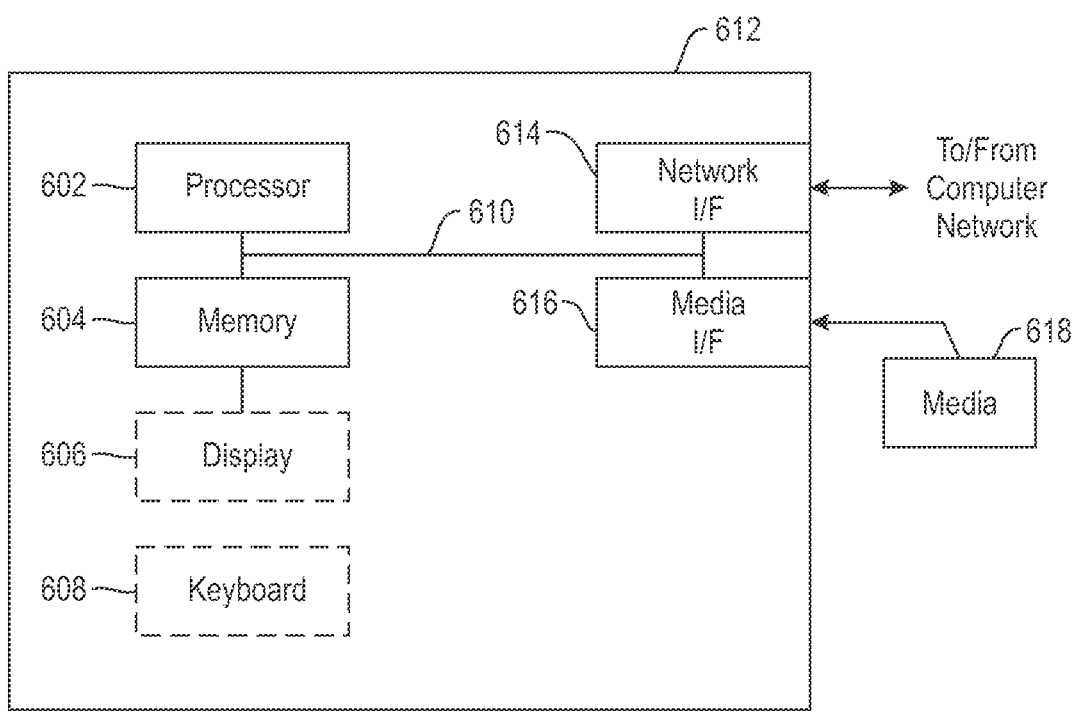
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, implementing a server-side version management wrapper that automatically senses project settings of a developer and automatically refactors given user credentials by externalizing sensitive information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising the following steps:
    automatically determining one or more project settings associated with a user;
    detecting one or more items of sensitive information in a check-in associated with the user in a shared version management system, wherein said check-in comprises an attempted submission of one or more local modifications made by the user to one or more files shared through the shared version management system, and wherein the items of sensitive information comprise one or more items of credential information that enable the user to access a particular application programming interface;
    invoking a version management wrapper in response to said detecting, wherein said version management wrapper comprises a plug-in component to said shared version management system, and wherein the version management wrapper is configured to:
    automatically refactor the one or more items of sensitive information in the check-in by externalizing the one or more items of sensitive information as an encrypted file; and
    upon acceptance by the user of one or more changes to the check-in, and based on the determined project settings, automatically (i) decrypt the encrypted file using one or more code repository credentials associated with the user, and (ii) incorporate the one or more items of sensitive information into the check-in;
    wherein said steps are executed by at least one computing device.

2. The method of claim 1, wherein said detecting comprises performing code analysis to identify application programming interface key usage.

3. The method of claim 2, wherein said performing code analysis comprises using a pattern library to identify application programming interface key usage.

4. The method of claim 2, wherein said performing code analysis comprises performing backward code slicing to identify application programming interface key usage.

5. The method of claim 1, wherein said encrypted file comprises an encrypted text file.

6. The method of claim 1, comprising:
    generating a preventive warning based on the one or more items of sensitive information detected in the check-in.

7. A computer program product, the computer program product comprising a computer readable storage medium having program instructions embodied therewith, the program instructions executable by a computing device to cause the computing device to:
    automatically determine one or more project settings associated with a user;
    detect one or more items of sensitive information in a check-in associated with the user in a shared version management system, wherein said check-in comprises an attempted submission of one or more local modifications made by the user to one or more files shared through the shared version management system, and wherein the items of sensitive information comprise one or more items of credential information that enable the user to access a particular application programming interface;
    invoke a version management wrapper in response to said detecting, wherein said version management wrapper comprises a plug-in component to said shared version management system, and wherein the version management wrapper is configured to:
automatically refactor the one or more items of sensitive information in the check-in by externalizing the one or more items of sensitive information as an encrypted file; and
upon acceptance by the user of one or more changes to the check-in, and based on the determined project settings, automatically (i) decrypt the encrypted file using one or more code repository credentials associated with the user, and (ii) incorporate the one or more items of sensitive information into the check-in.

8. The computer program product of claim 7, wherein said detecting comprises performing code analysis to identify application programming interface key usage.

9. A system comprising:
a memory; and
at least one processor coupled to the memory and configured for:
automatically determining one or more project settings associated with a user;
detecting one or more items of sensitive information in a check-in associated with the user in a shared version management system, wherein said check-in comprises an attempted submission of one or more local modifications made by the user to one or more files shared through the shared version management system, and wherein the items of sensitive information comprise one or more items of credential information that enable the user to access a particular application programming interface;
invoking a version management wrapper in response to said detecting, wherein said version management wrapper comprises a plug-in component to said shared version management system, and wherein the version management wrapper is configured to:
automatically refactor the one or more items of sensitive information in the check-in by externalizing the one or more items of sensitive information as an encrypted file; and
upon acceptance by the user of one or more changes to the check-in, and based on the determined project settings, automatically (i) decrypt the encrypted file using one or more code repository credentials associated with the user, and (ii) incorporate the one or more items of sensitive information into the check-in.

10. A method comprising the following steps:
automatically determining one or more project settings associated with a user;
detecting one or more items of sensitive information in a check-in associated with the user in a shared version management system, wherein said check-in comprises an attempted submission of one or more local modifications made by the user to one or more files shared through the shared version management system, and wherein the items of sensitive information comprise one or more items of credential information that enable the user to access a particular application programming interface;
invoking a version management wrapper in response to said detecting, wherein said version management wrapper comprises a plug-in component to said shared version management system, and wherein the version management wrapper is configured to:
automatically refactor the one or more items of sensitive information in the check-in by externalizing the one or more items of sensitive information as an anonymized file; and
upon acceptance by the user of one or more changes to the check-in, and based on the determined project settings, automatically replace the anonymized file in the check-in with a stored instance of the one or more items of sensitive information;
wherein said steps are executed by at least one computing device.

11. The method of claim 10, wherein said detecting comprises performing code analysis to identify application programming interface key usage.

12. The method of claim 11, wherein said performing code analysis comprises using a pattern library to identify application programming interface key usage.

13. The method of claim 11, wherein said performing code analysis comprises performing backward code slicing to identify application programming interface key usage.

14. The method of claim 10, wherein said externalizing comprises storing one or more user settings in a local file that is not committed.

15. The method of claim 10, comprising:
generating a preventive warning based on the one or more items of sensitive information detected in the check-in.

* * * * *